No. 848,886. PATENTED APR. 2, 1907.
C. E. DURYEA.
COOLING DEVICE FOR COMBUSTION ENGINES.
APPLICATION FILED APR. 9, 1903.
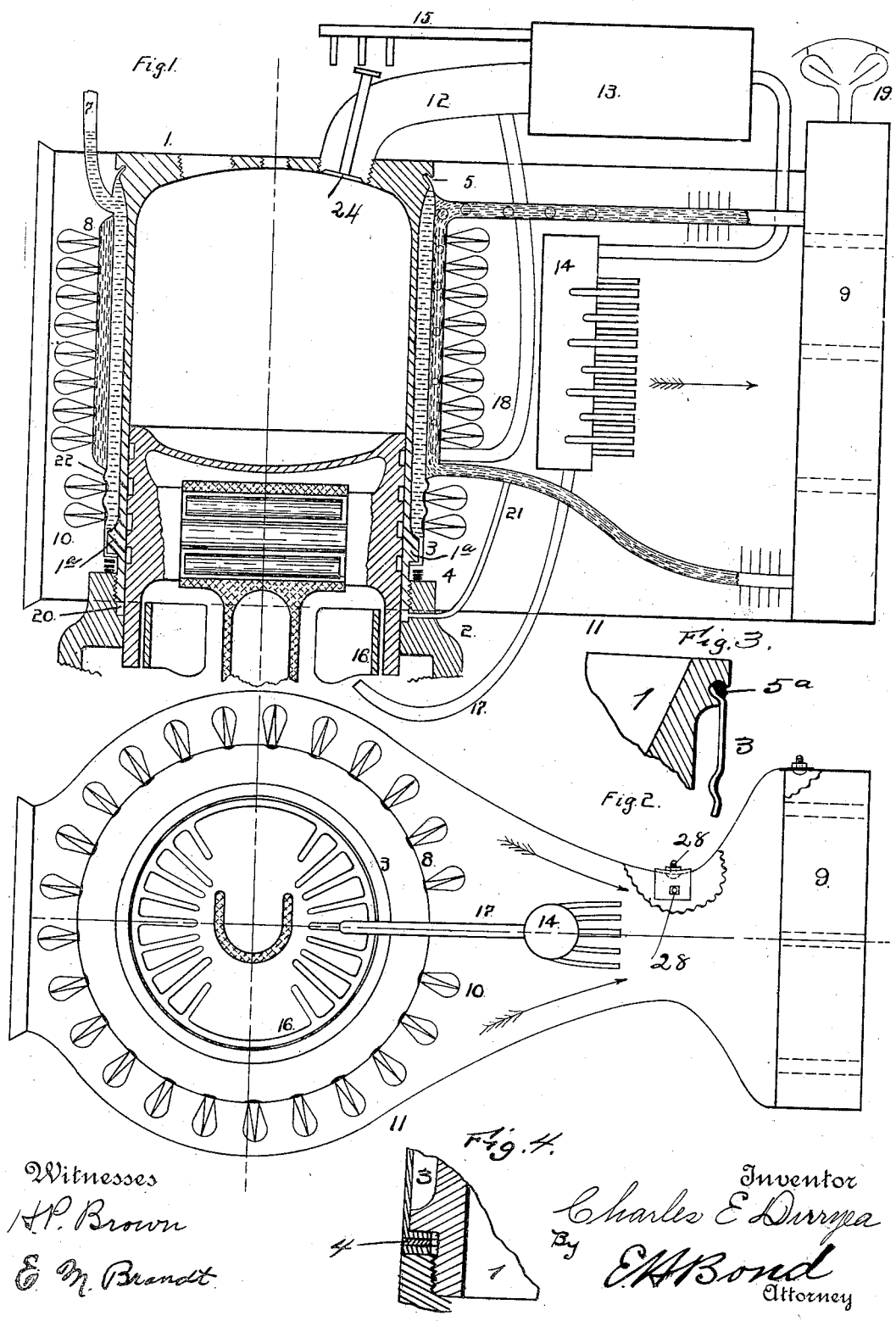
Witnesses
H. P. Brown
E. M. Brandt
Inventor
Charles E. Duryea
By E. H. Bond
Attorney

UNITED STATES PATENT OFFICE.

CHARLES E. DURYEA, OF READING, PENNSYLVANIA.

COOLING DEVICE FOR COMBUSTION-ENGINES.

No. 848,886.      Specification of Letters Patent.      Patented April 2, 1907.

Application filed April 9, 1903. Serial No. 151,807.

*To all whom it may concern:*

Be it known that I, CHARLES E. DURYEA, a citizen of the United States, residing at Reading, in the county of Berks and State of Pennsylvania, have invented certain new and useful Improvements in Cooling Devices for Combustion-Engines; and I do hereby declare the following to be a full, clear, and exact description of the invention, such as will enable others skilled in the art to which it appertains to make and use the same.

My invention relates to heat-engines in which the combustion or explosion takes place in the cylinder of the engine or to such engines as use gases of such high temperature that the engine parts immediately in contact therewith must be kept from becoming overheated; and the invention consists in certain improvements set forth in the following specification and shown in the accompanying drawings, forming part thereof.

The objects of my invention are to secure a uniform and advantageous temperature and to prevent excessive temperatures, to maintain this desired temperature closely, while preventing the undesired excessive temperature by forced circulation of air without the aid of moving mechanical parts, and to prevent damage by overheating of any of the important parts of the engine, to secure light weight, economic construction, and other objects, as will hereafter appear. The means I use to accomplish these objects are shown in the accompanying drawings, of which—

Figure 1 is an elevation, partly in section. Fig. 2 is a bottom plan, while Figs. 3 and 4 are details illustrating more fully the construction of the parts.

Similar letters refer to similar parts throughout the several views.

While my invention may be applied to heat-engines of many descriptions and to single or multiple cylinders, I have shown in Fig. 1 a single cylinder 1 attached to crank-case 2 by screwing a threaded portion of the cylinder into a properly-threaded part of the crank-case, which supports it firmly all around, but permits ready removal therefrom and makes a light but strong attachment. The cylinder is provided with a flange $1^a$, that serves as a stop to fix its position and forms an abutment against which it may be screwed tightly. This flange serves a further purpose in that a jacket 3 is attached at one end by being clamped between the flange and the crank-case 2.

In order that the cylinder may stop with the inlet and exhaust valves in proper position, one or more gaskets 4 are provided, which may be inserted between the flange of the cylinder and the crank-case against which it abuts. These gaskets being quite thin permit regulation of position of the cylinder within practical limits. Elasticity of the gasket and ability to force the threads more or less permit the cylinder to be brought into the desired position by this method, after which it may be retained there by the connection of the valves with the inlet and exhaust pipes or may be locked by a set-screw bearing against the screw-threads at the joint in any well-known manner.

To secure perfect workmanship, with uniformity of metal all around, the cylinder is preferably of cast metal machined inside and out and is provided at its head end with a groove 5, into which the corresponding end of the sheet-metal jacket 3 is inserted and held by being calked tightly in place by forcing a soft-metal ring $5^a$ into the groove, which binds the jacket in place and renders the joint tight. This jacket may be made single and adapted to retain a cooling liquid between it and the cylinder, as is common practice; but in order that higher temperatures than are commonly used may be secured I prefer to fill the space between the cylinder-wall and this jacket with something having a high vaporizing-point, either in the nature of a heavy oil or preferably in the nature of an easily-melted metallic alloy, and provide this jacket with an opening 7, through which the filling material may be introduced. The preferred alloy is of low heat conductivity, as likewise are most oils and liquids, so that the cylinder-wall may be of high temperature, while the outer surface of the jacket 3 may not be within many degrees of this same temperature. Since it is difficult to make a separate jacket join closely to the metal of the cylinder, the use of this alloy or liquid insures a uniform passage for the heat from the cylinder-walls to the cooling means, whether of liquid or other kind provided on the outside of the jacket. This fact is particularly valuable in connection with the use of copper for radiation and iron for the construction of the cylinder, because the expansion of the copper tends to increase its size and destroy that intimate contact necessary to perfect conduction. More particularly is this true with a construction wherein the radiating devices are riveted to the copper jacket, for in such an event an intimate contact between copper and the iron cannot be secured and some alloy or liquid is necessary. While the jacket might be soldered in position, it is preferable to fill the space between the jacket and the cylinder with liquid maintained in position by the absence of opportunities to escape. I further prefer to provide the jacket 3 with a secondary jacket 8, in which the water or other liquid may be contained in the customary and well-known manner. The difference in temperature between the cylinder-wall and the wall of the jacket 3 permits a much higher cylinder-wall temperature than would be possible if the water were directly in contact therewith, and by suitable thickness of alloy inside the jacket 3 the temperature of the motor may be regulated accordingly, for since water boils away at a given temperature and since the thickness of such alloy determines practically the difference in temperature between the cylinder-wall and the jacket-wall it will be seen that the temperature of the cylinder-wall cannot rise much above a given or predetermined point. Since, however, many engines have low compression—as, for example, in automobile use—and since a poor mixture requires a high compression or temperature to produce spontaneous ignition, it is preferred to use a temperature of the cylinder-wall much higher than the boiling-point of water, and since metallic alloys are heavy and a thin body of melted metal or liquid is preferred to a thick one I keep the jacket 3 as small as practicable, thus diminishing quantity and weight of material between it and the cylinder-wall and secure a higher temperature by the use of some other liquid than water in the outer jacket. Whatever liquid is used, the heat eventually must pass into the atmosphere by radiation, and since hot surfaces will radiate more rapidly than cooler ones I prefer to fill the jacket 8 with a liquid having a high vaporizing-point, such as high-fire-test mineral oil, and provide means for exposing the surfaces of the jacket 8, the tank 9, and the pipes and connections to the air as freely and fully as possible. To secure this result, I preferably use a tubular tank 9, Figs. 1 and 2, in which a body of the liquid is contained, with suitable piping to and from the jacket of the engine to permit a circulation of the liquid. I further provide either or both jackets, when both are used, with radiating-wings to conduct the heat outward from the jackets and expose a large metal surface to the air. It is of course self-evident that this liquid may be circulated inside the jacket 3 as readily and conveniently as inside the jacket 8; but because of the advantages of high cylinder-wall temperature the method shown is preferred.

The projecting fins 10 are preferably made of some metal having high thermal conductivity, such as copper, securely fastened to the jackets; but since these jackets are of thin metal and exposed to high heat these fins cannot be fastened by the ordinary method of soft soldering and are therefore preferably riveted in place. The base of the fin may be hollow for saving in weight and increased readiness of riveting. They may be further secured against leakage of the liquid contained in the jacket by brazing, if desired. Of course these fins may be attached to the cylinder-walls; but because of the difficulty of riveting them thereto the method employed of using a jacket of sheet metal carrying the fins is preferred. Fins of other shape, such as flanges or rings, may be used, but the preferred method is as shown. The tank 9, Figs. 1 and 2, is of ordinary and well-known construction, exposing large radiating-surface.

I preferably place the cylinder with its jacket and the tank 9 in such relation to each other that a natural circulation, due to the expansion of the liquid under the influence of heat, may result and that a free passage of air around the cylinder and through the tank, as indicated by arrows, Fig. 2, may likewise result. If a motor-vehicle motor is placed with the tank at its rear and surrounded more or less completely by a casing 11, a current of air may be induced through this casing by its funnel-shaped mouth catching the air through which the vehicle passes and by the utilization of the energy of the exhaust-gases to induce a current. I accomplish this utilization as follows: In Fig. 1 a pipe 12 is shown leading from the exhaust-valve to a muffler 13, in which the gases are allowed to expand, thus silencing the noise caused by their sudden exit. From the muffler 13 a smaller pipe leads to an injector 14, which in turn is provided with a number of still smaller pipes pointing away from the cylinder. These pipes are so located and the sheet-metal case 11 is so placed that the escaping gases expend their energy inducing a draft of air around the cylinder and ejecting the same out through the tubes of the tank 9. The fact that the exhaust-gases have been fully expanded robs them of most of their heat, and the high temperature of the liquid in the jacket and tank causes a wide difference in temperature between the mingled air and gases and the metallic surfaces with which they come in contact, so that radiation of heat is very rapid and the gases pass away much heated, which arrangement permits a small amount of radiating-surface to suffice for a cylinder of large power. As will be seen in Fig. 2, the shape of the case 11 is designed to secure the most efficient induction and ejection of the cooling current of air. For the purpose of preventing excessive temperature in such important parts as the exhaust-valve I pipe from the muffler one or more additional jets and permit the same to blow upon the parts supporting the exhaust-valve, as shown at 15, Fig. 1—a simple yet efficient means of cooling any desired portion.

Since the piston is exposed to intense heat and with little chance for radiation, I provide for cooling this by ribs or fins projecting inwardly from its walls. These are usually attached by making them of some metal having a higher expansion coefficient than the metal of which the piston is made and by this expansion insuring a firm contact between the fin-ring 16 (see Figs. 1 and 2) and the inner walls of the piston. In some instances, as in the two-cycle type, the piston is exposed to a fresh charge each revolution, and these fins become very effective without further mechanism, while in the four-cycle type the crank-case may be left open, and thus fresh air permitted to reach the piston. To secure increased effectiveness in some forms, I prefer to run a small pipe 17 into the crank-case in such a manner as to permit one or more jets of the exhaust-gases to blow into the piston, causing a current of air to circulate therein. (See Figs. 1 and 2.)

Since with a small radiating-surface a rapid transfer of heat is necessary and since with a liquid having a high boiling-point the variation in density would not be great, it may sometimes be necessary to assist the circulation of the liquid from the tank to the jacket and return by some means. While of course pumps or similar mechanical methods may be used in connection with other parts of my invention, I prefer to take from the muffler or the exhaust-pipe a small pipe 18, which will force into the circulating medium bubbles of gas that lessen its density and cause the mingled liquid and bubbles to move rapidly upward and toward the tank, in which case I provide on the top of the tank (see Fig. 1) a trap 19 to separate the bubbles from the liquid and permit their escape into the atmosphere.

Since high temperatures are not conducive to freedom from friction between mechanical bearing-surfaces, I provide the piston wrist-pin with antifriction-bearing devices, such as rollers, (see Fig. 1,) and in this way render this bearing practically immune from heat troubles.

Of course radiating fins or flanges may be provided on the outer surface of the tank 9 and the connecting-pipes, as well as on the outer surface of the jackets. The utilization of the exhaust-gases for the purpose of inducing a current of air not only avoids utilizing the power of the motor for this purpose, but avoids mechanical means, with their increased cost of construction, their liability to wear, rattle, and give trouble, and similar disadvantages. I prefer the means shown for utilizing the energy of the exhaust-gases for cooling purposes by expanding them, separating them into small streams, and utilizing the velocity of the streams in their expanded and cooled condition to induce and eject a current of air.

The passage of the expanded gases into the open air through small tubes adds greatly to the silencing effect and lessens the need for a large muffler, securing an additional advantage because of this fact. In some instances, particularly where the oil-containing tank 9 is left open at the top, and therefore free from pressure, as shown in Fig. 1, I prefer to use the tank 9 not only as the reservoir for the cooling-oil, but for the lubricating-oil, and in this case provide means for supplying this oil to the surface of the piston or to other points where lubrication is needed, as is shown by the pipe 21, leading to the groove 20, (or some oil-distributing arrangement,) as shown in Fig. 1. The size of the pipe 21 may be such as to feed the proper quantity of oil when hot, depending upon the inability of the oil to escape when the piston is in motion and its stiffness when cold, and when the piston is at rest to prevent undue leakage, or any well-known adjustment may be provided for the purpose of regulating the flow of oil. It is quite evident, however, that means for shutting off the flow of oil through the pipe 21 may be provided, if necessary. This provision to utilize the cooling-oil for lubrication purposes insures the introduction of fresh oil at frequent intervals and prevents that deterioration or staleness which may be the result of long usage of the oil for cooling purposes without being hermetically sealed or being renewed. If sealed, so as to prevent evaporation, deterioration is practically impossible and renewal therefore unnecessary; but since lubrication must be provided no more ready means is at hand than the one shown.

By my construction I secure uniformity of cylinder-wall circumferentially, and, if preferred, longitudinally, thus removing any tendency to warp, due to the presence of irregular shapes of heavy and light masses of iron. This uniformity practically secures perfect cylindricity under varying temperatures and permits the piston-rings to remain in contact with the cylinder-wall and prevent the escape of gases irrespective of variation in temperatures, a most essential feature in high-temperature engines. It will readily be seen that at low temperatures thick lubricating-oil will prevent much escape of the gases, but at high temperatures a perfect contact at all parts of the cylinder and packing-rings must be depended upon.

Since the highest pressures come at the head of the cylinder, this construction permits the walls to be made lighter at the opposite end, thus saving some weight without interfering with the perfection of behavior of the cylinders. The cylinder as constructed is free from warping, because the masses of iron are even everywhere, but may or may not be even longitudinally—that is to say, one end of the cylinder may be either thicker or thinner than the other, but at any given point of its length the thickness is uniform in a plane at right angles to its axis. Corrugation is not advisable on the cylinder-walls, for the outer portions of the corrugations being colder than the inner portions remain smaller and compress the metal under them, causing a slight corrugation of the inner surface, and thus tending to destroy perfect compressions. Corrugation of the jacket does not produce any deleterious effect, but, on the other hand, permits elasticity in the jacket that takes up any expansion, due to the high-expansion coefficient of the jacket material, as well as increasing the radiating-surface, (see 22, Fig. 1.) The method of attaching the jacket shown permits ready removal when the cylinder is removed, for in this event the clamped end is no longer held, and the opposite end may be withdrawn from the groove in which it extends. If removability is desired, the gasket used must be of such material that the pressure of the jacket upon it when clamped will form a tight joint. If the jacket is not to be removed, the gasket may be of metal calked into place. Since the expansion coefficient of the jacket is higher than that of the cylinder, the filling between the jacket and cylinder must be either a liquid or something that becomes liquid at working temperatures, so that it may absolutely and positively fill the space, and thus at all times properly transmit the heat.

The use of a rigid jacket and an alloy having much tendency to shrink or expand when cold would necessitate a vent, as shown in Fig. 1, although in many cases the elasticity of the jacket will be ample to provide for this shrinkage or expansion without the use of a vent. Since there is need for more cooling effect around the combustion-chamber than at the opposite end of the cylinder, I prefer to provide a more efficient cooling means and have therefore shown the second jacket not extending the full length of the cylinder, utilizing air radiation as the second means at the cooler end of the cylinder. This is but one of the many ways in which the temperature of the opposite ends of the cylinders can be regulated substantially at will. This effect is accomplished, as shown, by air radiation only at one end and a liquid circulation with radiating-fins for air-cooling outside at the other.

Since the end of the connecting-rod forming the wrist-pin bearing is quite large, it is necessary to either keep the radiating-fins inside the piston short enough to permit this end free passage, or else, as I prefer, to make the radiating-surface on a separate removable piece, as shown in Figs. 1 and 2.

I have shown an ordinary tubular tank; but this is not a necessary part of my invention, and any system of pipes adapted to contain more or less liquid and expose it to the current of air will serve my purpose. It is quite common to equip pipes with radiating disks, as indicated in Fig. 1, and this method I can utilize instead of the tank or in conjunction therewith, if desired.

While it is ordinarily objectionable to surround a motor with a casing, because it prevents accessibility to the working parts, I have overcome this objection by placing the valves, one of which, 24, is shown in Fig. 1, in which view there is also shown an opening for the other valve and a central opening for the spark-plug, and ignition mechanism on the head of the cylinder, thus perfectly freeing the sides of the cylinder from all parts excepting the cooling devices. I construct, however, this casing detachable at the joints, which permits any side being removed or the entire casing being removed, if desired, being held in place by bolts 28, thus permitting ready access to the cylinder for removing it or the jacket when needed. It will be noted that the casing has a "vena contracta" shape to form the injector, as shown.

I claim—

1. In a heat-engine, a crank-case, a cylinder screwed thereinto, and a sheet-metal jacket removably attached at one end between said case and cylinder.

2. In a heat-engine one or more cylinders having lateral flanges and removably attached to a common crank-case by screw-threads in the ends of said cylinders and a sheet-metal jacket clamped at one end between said flanges and case, said cylinders being adapted to be stopped in a predetermined position by the interposition of suitable gaskets in conjunction with said flanges.

3. In a heat-engine a cylinder having a sheet-metal jacket and adapted to be attached to a crank-case by the use of screw-threads on the end of the cylinder and a flange which serve to both fix the cylinder and to clamp one end of the jacket.

4. In a heat-engine, a crank-case, a cylinder screwed thereinto, a sheet-metal jacket removably attached at one end between said case and cylinder, the cylinder at the other end being provided with an exterior groove receiving the end of the jacket, and a soft-metal ring in said groove binding said jacket in place.

5. In combination with a heat-engine whose piston is open to the air at one end, a casing surrounding the same and having openings to permit air circulation, a muffler, a pipe leading from the muffler, and an injector in the casing having multiple small jets for causing a circulation of air through the same, said injector being connected with the muffler by said pipe, and a pipe leading from an exhaust-passage into the open end of the piston to increase the circulation of air therein.

6. In a heat-engine, a piston open to the air at one end, a casing surrounding the engine and having openings to permit air circulation, a jacket surrounding the cylinder, a tank, means for the circulation of a cooling medium through said tank and jacket, a muffler, an injector connected to the muffler and having multiple small outlet-jets for causing a circulation of air through the casing, and a pipe leading from the injector into the open end of the piston.

7. In a heat-engine, a piston open to the air at one end, a casing surrounding the engine and having openings to permit air circulation, a jacket surrounding the cylinder, a tank, a trap at the top of the tank, means for the circulation of a cooling medium through said tank and jacket, a muffler, an injector connected to the muffler and having multiple small outlet-jets for causing a circulation of air through the casing, and a pipe leading from the injector into the open end of the piston.

8. In a heat-engine, a plurality of liquid-containing jackets, a filling of easily-melted metallic alloy between one of said jackets and the cylinder, and piping for containing liquid, a circulating medium consisting of lubricating-oil and means for oiling the piston from the circulating-supply.

9. In combination with a heat-engine, a tank for containing oil, a casing inclosing the engine, a jacket for the cylinder, with means for causing a circulation of air through the casing, consisting of multiple jets of exhaust-gases, means for forcing into said oil bubbles of gas to lessen the density of said oil, a connection between the tank and the cylinder-jacket and a trap in the top of said tank to separate the bubles from the oil and to permit the escape thereof to the atmosphere.

10. The combination with a cylinder having a flange, and a groove near one end, and a crank-case, of a jacket having one end seated in said groove and the other end engaged beneath said flange, and gaskets interposed between the flange and the end of the crank-case and engaged by the end of said jacket as and for the purpose specified.

11. In a combination with a heat-engine, a suitable jacket for containing oil, a supply-tank connected therewith, a second jacket containing an easily-melted metallic alloy interposed between the cylinder-wall and said oil-jacket, means for forcing gas into the oil, and a separator in said tank constructed to eliminate the gases from the oil in said tank.

In testimony whereof I affix my signature in presence of two witnesses.

CHARLES E. DURYEA.

Witnesses:
 E. A. RUTH,
 H. D. HART.